(12) United States Patent
Matsumoto et al.

(10) Patent No.: US 11,029,154 B2
(45) Date of Patent: *Jun. 8, 2021

(54) DEFLECTING DEVICE AND SURVEYING INSTRUMENT

(71) Applicant: TOPCON CORPORATION, Tokyo (JP)

(72) Inventors: Hideyuki Matsumoto, Tokyo (JP); Fumio Ohtomo, Asaka (JP); Kaoru Kumagai, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 278 days.

This patent is subject to a terminal disclaimer.

(21) Appl. No.: 15/975,049

(22) Filed: May 9, 2018

(65) Prior Publication Data

US 2018/0328728 A1   Nov. 15, 2018

(30) Foreign Application Priority Data

May 12, 2017  (JP) ............................... JP2017-95758

(51) Int. Cl.
*G01C 15/00* (2006.01)
*G02F 1/29* (2006.01)
(Continued)

(52) U.S. Cl.
CPC .......... *G01C 15/002* (2013.01); *G01S 7/4817* (2013.01); *G01S 17/42* (2013.01); *G01S 17/86* (2020.01); *G02B 7/1805* (2013.01); *G02B 26/0883* (2013.01); *G02B 26/108* (2013.01); *G02F 1/29* (2013.01); *G02F 1/291* (2021.01)

(58) Field of Classification Search
CPC ... G01C 15/002; G02F 1/29; G02F 2001/291; G02B 26/108; G02B 26/0883; G02B 7/1805; G01S 17/42; G01S 7/4817; G01S 17/86; G01S 517/86
See application file for complete search history.

(56) References Cited

U.S. PATENT DOCUMENTS 5,462,810 A   10/1995   Keller et al.
8,218,131 B2   7/2012   Otani et al.
(Continued)

FOREIGN PATENT DOCUMENTS

JP   2000-346645 A   12/2000
JP   2008-076303 A   4/2008
(Continued)

*Primary Examiner* — Daniel L Murphy
(74) *Attorney, Agent, or Firm* — Chiesa Shahinian & Giantomasi PC (57) ABSTRACT

A deflecting device and surveying instrument comprising a holding member having a ring shape; ring gears disposed on both sides of the holding member with the holding member interposed the ring gears, the ring gears being concentric with the holding member; bearings disposed between the holding member and the ring gears on both sides of the holding member, the bearings being concentric with the holding member; optical deflecting members disposed at central portions of the ring gears and integrated with the ring gears; deflection motors corresponding to the respective ring gears; and a drive transmitting member configured to transmit rotary force of the deflection motors to the ring gears.

15 Claims, 7 Drawing Sheets

(51) Int. Cl.
  *G02B 26/10* (2006.01)
  *G02B 26/08* (2006.01)
  *G01S 17/42* (2006.01)
  *G02B 7/18* (2021.01)
  *G01S 7/481* (2006.01)
  *G01S 17/86* (2020.01)

(56) References Cited

U.S. PATENT DOCUMENTS

| | | | |
|---|---|---|---|
| 10,823,823 B2 * | 11/2020 | Ohtomo | G01S 7/4817 |
| 2016/0238385 A1 | 8/2016 | Ohtomo et al. | |
| 2016/0238708 A1 | 8/2016 | Ohtomo et al. | |
| 2019/0004154 A1 * | 1/2019 | Matsumoto | G01C 3/08 |

FOREIGN PATENT DOCUMENTS

| | | | | |
|---|---|---|---|---|
| JP | 2016-151422 A | | 8/2016 | |
| JP | 2016-151423 A | | 8/2016 | |
| WO | WO-2004099849 A1 * | 11/2004 | | G02B 26/108 |

* cited by examiner

DEFLECTING DEVICE AND SURVEYING INSTRUMENT

CROSS-REFERENCE TO RELATED APPLICATION

This application is based upon and claims benefit of priority from Japanese Patent Application No. 2017-95758, filed May 12, 2017, the entire contents of which are incorporated herein by reference.

TECHNICAL FIELD

The present disclosure relates to a deflecting device and a surveying instrument that are capable of deflecting an optical axis two-dimensionally.

BACKGROUND

A surveying instrument, for example, a total station, includes a mount section capable of rotating in a horizontal direction; and a telescope section disposed on the mount section and capable of rotating in a vertical direction, a distance meter and a collimator being embedded in the telescope section, and distance measuring light illuminating a measurement target object concentrically with the collimator.

In the total station, horizontal rotation of the mount section and vertical rotation of the telescope section cooperate to deflect the distance measuring optical axis in two directions, horizontally and vertically.

The mount section and the telescope section have a great mass and are difficult to rotate fast and stop promptly but are required to have significantly high angle accuracy. Thus, high machining accuracy and assembling accuracy are required for the mechanism, resulting in high manufacturing cost.

SUMMARY OF THE EMBODIMENTS

An object of the disclosure is to provide an inexpensive deflecting device and surveying instrument that are capable of deflecting a distance measuring optical axis at high speed in two directions, horizontally and vertically.

According to an aspect of the disclosure, a deflecting device includes: a holding member having a ring shape; ring gears disposed on both sides of the holding member with the holding member interposed between the ring gears, the ring gears being concentric with the holding member; bearings disposed between the holding member and the ring gears on both sides of the holding member, the bearings being concentric with the holding member; optical deflecting members disposed at central portions of the ring gears and integrated with the ring gears; deflection motors corresponding to the respective ring gears; and a drive transmitting member configured to transmit rotary force of the deflection motors to the ring gears. Each of the bearings includes an outer ring fitted into and fixed to an outer ring fitting section on either one of the holding member and the corresponding ring gear. Each of the bearings includes an inner ring fitted into and fixed to an inner ring fitting section on the other of the holding member and the corresponding ring gear. The ring gears on both sides of the holding member are supported by the holding member, the ring gears being configured to rotate independently of each other. The deflection motors are configured to independently rotate the respective optical deflecting members together with the ring gears.

According to an aspect of the disclosure, in a deflecting device, each of the ring gears includes a groove having a ring shape in a surface of each of the ring gears, the surface facing the holding member. The groove includes an inner edge portion protruding toward the holding member and serving as the inner ring fitting section, and the holding member includes outer edges protruding toward the ring gears and serving as the outer ring fitting sections.

According to an aspect of the disclosure, in a deflecting device, each of the ring gears includes a groove having a ring shape in a surface of each of the ring gears, the surface facing the holding member. The groove includes an outer edge portion protruding toward the holding member and serving as the outer ring fitting section, and the holding member includes inner edges protruding toward the ring gears and serving as the inner ring fitting sections.

According to an aspect of the disclosure, in a deflecting device, each of the optical deflecting members includes a plurality of prisms arranged parallel with each other.

According to an aspect of the disclosure, in a deflecting device, the ring gears are timing pulleys, driving timing pulleys are disposed on output shafts of the deflection motors, timing belts are disposed between the ring gears and the driving timing pulleys, and the ring gears are configured to be rotated by the deflection motors through the timing belts.

According to an aspect of the disclosure, in a deflecting device, the outer ring fitting sections and the outer rings of the bearings are bonded to each other, and the inner ring fitting sections and the inner rings of the bearings are bonded to each other.

Furthermore, according to an aspect of the disclosure, a surveying instrument includes: a distance meter including a light emitting element configured to send out distance measuring light, a distance measuring light emitter configured to emit the distance measuring light, a receiver configured to receive reflected distance measuring light, and a light receiving element configured to receive the reflected distance measuring light and to generate a light reception signal, the distance meter being configured to measure a distance to a measurement target object on a basis of the light reception signal from the light receiving element; an optical axis deflector disposed on a distance measuring optical axis and configured to deflect the distance measuring optical axis; an emission direction detector configured to detect a deflection angle of the distance measuring optical axis; and a computation controller configured to control deflecting action of the optical axis deflector and distance measuring action of the distance meter. The optical axis deflector is any one of the above-described deflecting devices. The computation controller is configured to measure a horizontal angle and a vertical angle of the measurement target object on a basis of the deflection angle detected by the emission direction detector and to acquire three-dimensional coordinates of the measurement target object on a basis of a distance value from the distance meter and the horizontal angle and vertical angle.

According to an aspect of the disclosure, the deflecting device includes: a holding member having a ring shape; ring gears disposed on both sides of the holding member with the holding member interposed between the ring gears, the ring gears being concentric with the holding member; bearings disposed between the holding member and the ring gears on both sides of the holding member, the bearings being concentric with the holding member; optical deflecting members disposed at central portions of the ring gears and integrated with the ring gears; deflection motors corresponding to the respective ring gears; and a drive transmitting member configured to transmit rotary force of the deflection motors to the ring gears. Each of the bearings includes an outer ring fitted into and fixed to an outer ring fitting section on either one of the holding member and the corresponding ring gear. Each of the bearings includes an inner ring fitted into and fixed to an inner ring fitting section on the other of the holding member and the corresponding ring gear. The ring gears on both sides of the holding member are supported by the holding member, the ring gears being configured to rotate independently of each other. The deflection motors are configured to independently rotate the respective optical deflecting members together with the ring gears. This configuration enables deflection in two axial directions with a simple configuration, high-speed rotation because of small mass of the rotating portions of the optical deflecting members, inexpensive manufacture because of a small number of components, and highly accurate deflection because of small effect of a rotation error on deflection.

According to an aspect of the disclosure, the surveying instrument includes: a distance meter including a light emitting element configured to send out distance measuring light, a distance measuring light emitter configured to emit the distance measuring light, a receiver configured to receive reflected distance measuring light, and a light receiving element configured to receive the reflected distance measuring light and to generate a light reception signal, the distance meter being configured to measure a distance to a measurement target object on a basis of the light reception signal from the light receiving element; an optical axis deflector disposed on a distance measuring optical axis and configured to deflect the distance measuring optical axis; an emission direction detector configured to detect a deflection angle of the distance measuring optical axis; and a computation controller configured to control deflecting action of the optical axis deflector and distance measuring action of the distance meter. The optical axis deflector is any one of the above-described deflecting devices. The computation controller is configured to measure a horizontal angle and a vertical angle of the measurement target object on a basis of the deflection angle detected by the emission direction detector and to acquire three-dimensional coordinates of the measurement target object on a basis of a distance value from the distance meter and the horizontal angle and vertical angle. This configuration exhibits excellent effect of enabling readily and prompt collimation and measurement as a total station or a laser scanner.

DESCRIPTION OF EMBODIMENTS

Embodiments of the invention will be described next with reference to the drawings.

First, a surveying instrument 1 including a deflecting device according to the invention will be described with reference to FIG. 1.

The surveying instrument 1 is installed with a tripod 2 being a supporting device. In the drawings, an optical axis, in an undeflected state, of the surveying instrument 1 (reference optical axis) is designated by O. In FIG. 1, a prism being a target or a measurement target object is designated by 7. The prism 7 is disposed in a predetermined position on a pole 8 (for example, at a known distance from the lower end).

The surveying instrument 1 is attached to the tripod 2 with a rotary table 5 therebetween. The rotary table 5 includes a lever 6. The operation of the lever 6 enables the surveying instrument 1 to rotate in an up-down direction (vertical direction) or a lateral direction (horizontal direction) and to be fixed in a specific attitude.

Figure 2:
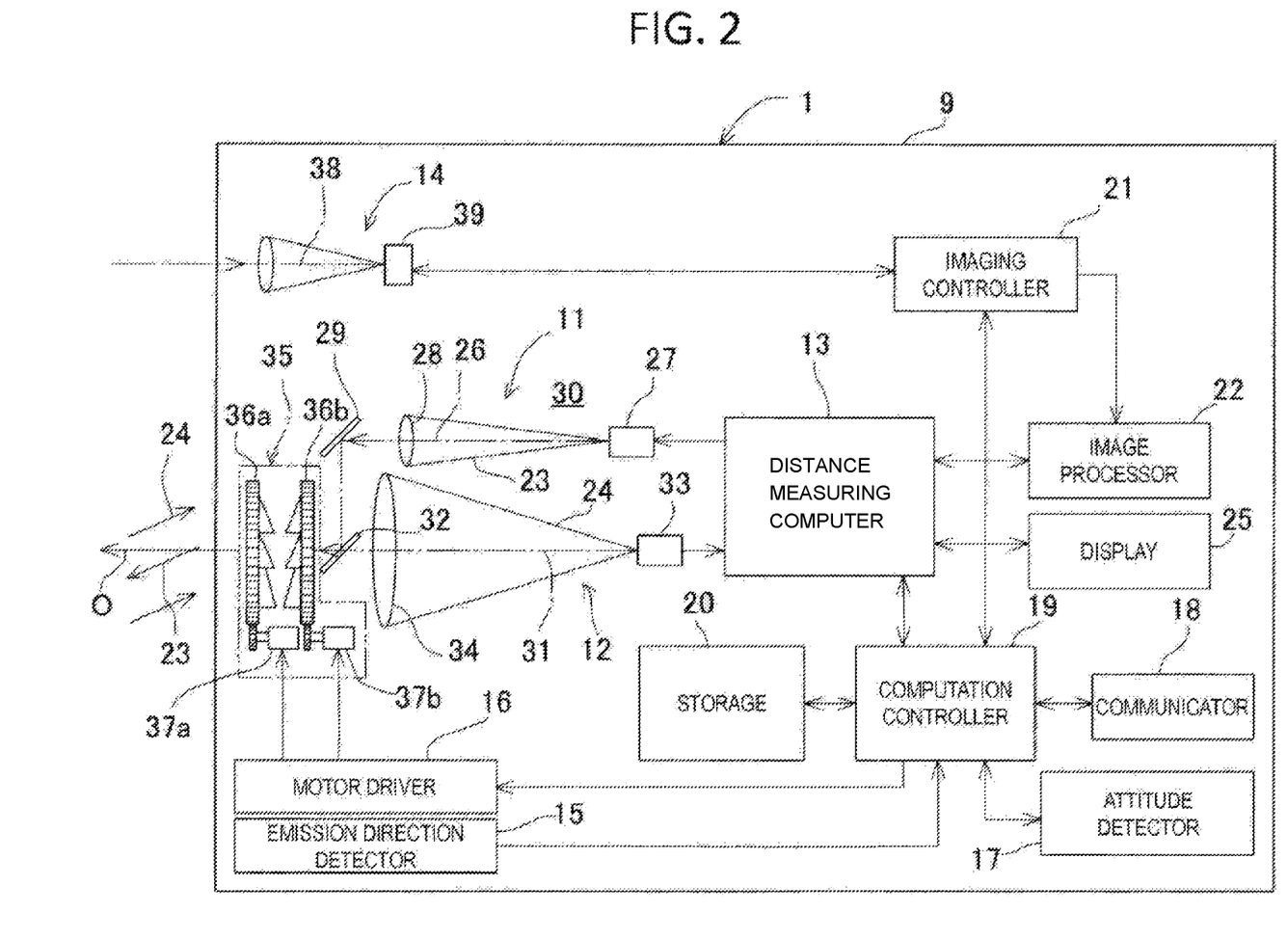
FIG. 2 is a schematic block diagram of the surveying instrument.

The distance measuring light emitter 11 includes an emission optical axis 26. A light emitting element 27, such as a laser diode (LO), is disposed on the emission optical axis 26. A projection lens 28 is also disposed on the emission optical axis 26. Furthermore, a first reflection mirror 29 being an optical deflecting member is disposed on the emission optical axis 26, and a second reflection mirror 32 being an optical deflecting member is disposed on a reception light optical axis 31. The first reflection mirror 29 and the second reflection mirror 32 deflect the emission optical axis 26, so that the emission optical axis 26 coincides with the reception light optical axis 31. The first reflection mirror 29 and the second reflection mirror 32 constitute an emission optical axis deflector.

Figure 4:
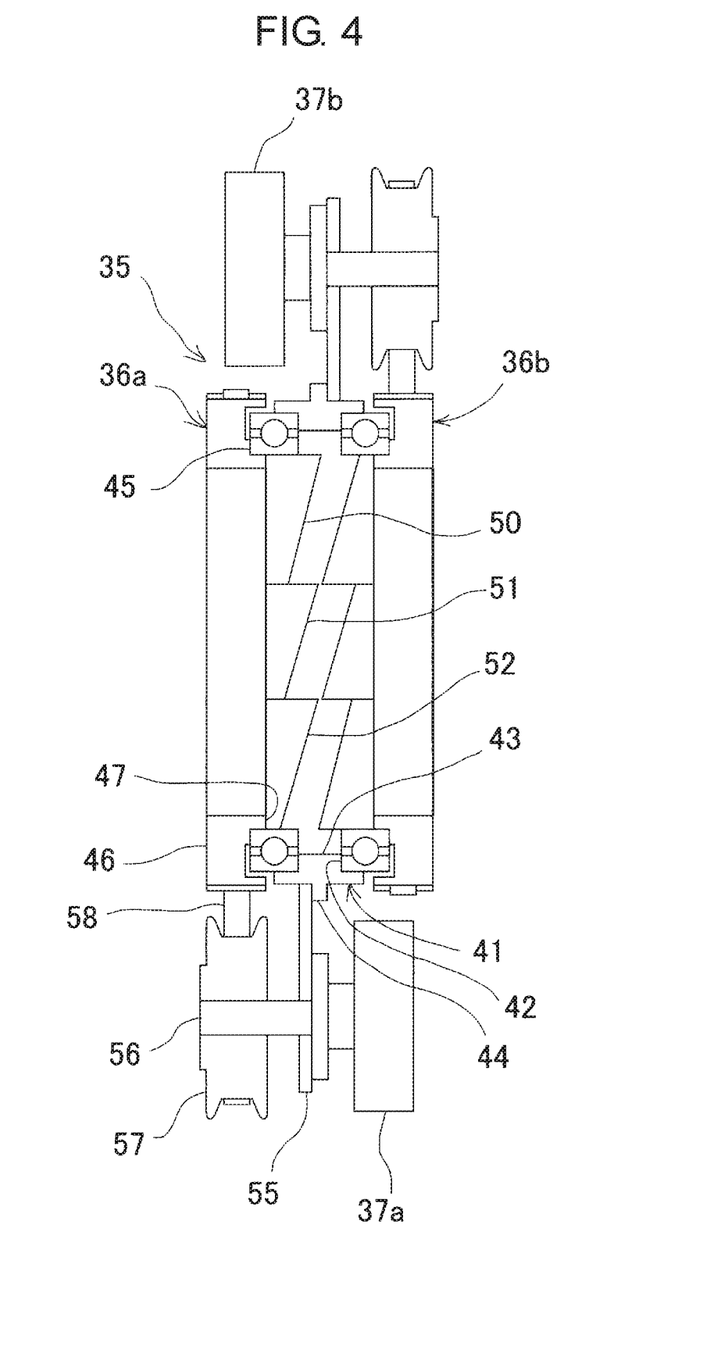
FIG. 4 is a view taken along the line A-A of FIG. 3.

The attachment flange 44 is fixed to a structural member supporting the optical axis deflector 35. For example, the attachment flange 44 is fixed to the housing 9. Thus, the holding member 41 is supported by the structural member, and the prism deflection plates 36a, 36b are rotatably supported by the holding member 41 with the bearings 45, 45 therebetween.

Figure 7:
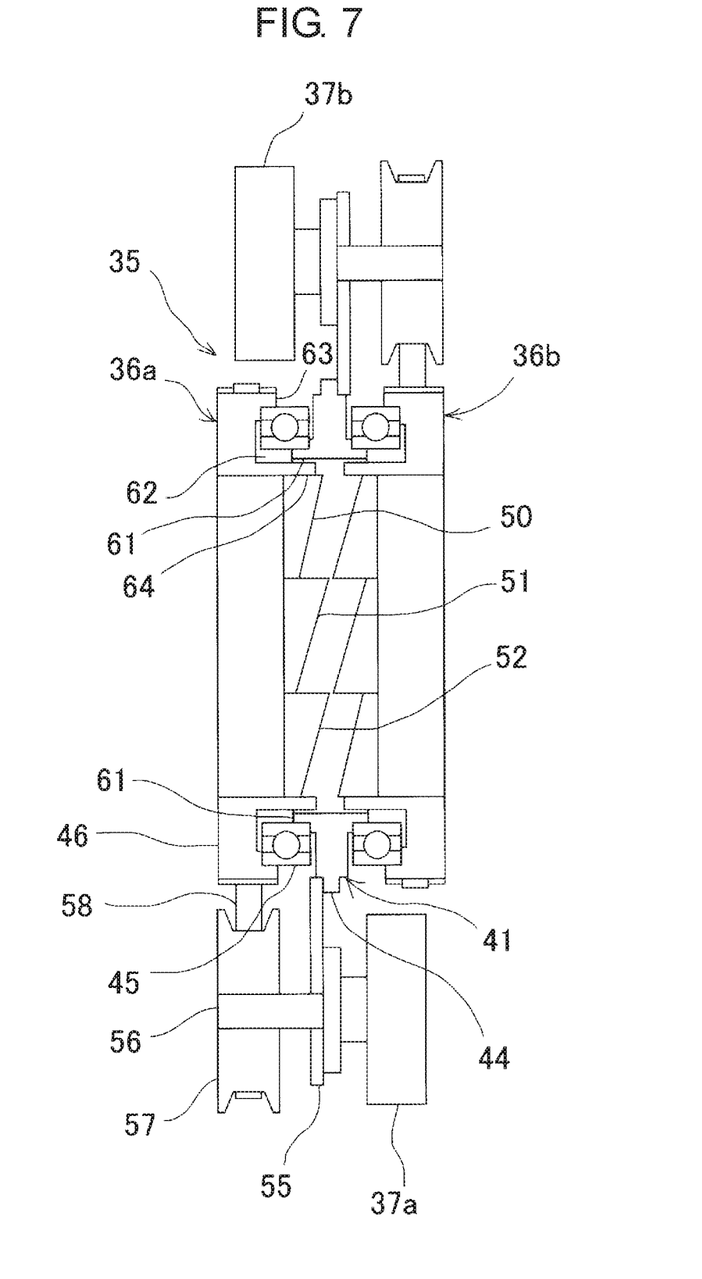
FIG. 7 is a view, corresponding to the view taken along the line A-A of FIG. 3, according to another embodiment of the invention.

This embodiment has a structure in which the prism deflection plate 36a and the prism deflection plate 36b are provided interposing the holding member 41 therebetween in the same manner as the structure of the above-described embodiment. However, in this embodiment, the inner rings of the bearings 45 are fixed to the holding member 41, and the outer rings of the bearings 45 are fixed to the ring gear 46.

The light emitting element 27 sends out a pulse laser beam, and the distance measuring light emitter 11 emits the pulse laser beam sent out from the light emitting element 27, as distance measuring light 23.

The receiver 12 will be described. Reflected distance measuring light 24 from the measurement target object (that is, the prism 7) is incident on the receiver 12. The receiver 12 has the reception light optical axis 31. As described above, the emission optical axis 26 deflected by the first reflection mirror 29 and the second reflection mirror 32 coincides with the reception light optical axis 31. The state in which the emission optical axis 26 coincides with the reception light optical axis 31 is indicated by a distance measuring optical axis 40 (see FIG. 1).

An optical axis deflector 35 is disposed on the deflected emission optical axis 26, that is, the reception light optical axis 31. The straight optical axis passing through the center of the optical axis deflector 35 is the reference optical axis O. The reference optical axis O coincides with the emission optical axis 26 or the reception light optical axis 31 in a case of not being deflected by the optical axis deflector 35.

An imaging lens 34 and a light receiving element 33, such as a photodiode (PD), are disposed on the reception light optical axis 31 of the incident light passing through the optical axis deflector 35. The imaging lens 34 forms an image of the reflected distance measuring light 24 on the light receiving element 33.

The distance measuring light 23 emitted from the distance measuring light emitter 11 is deflected toward the measurement target object by the optical axis deflector 35 and illuminates the prism 7.

The reflected distance measuring light 24 reflected off the prism 7 is deflected by the optical axis deflector 35 so as to coincide with the reception light optical axis 31 and is incident on the receiver 12.

The imaging lens 34 forms an image of the reflected distance measuring light 24 on the light receiving element 33. The light receiving element 33 receives the reflected distance measuring light 24 and generates a light reception signal. The light reception signal is input to the distance measuring computer 13. The distance measuring computer 13 measures a distance to a measurement point on the basis of the light reception signal.

The imager 14 has an imaging optical axis 38 parallel with the reference optical axis O of the surveying instrument 1, is a camera having an angle of view greater than the maximum deflection angle (for example, ±20°) of the optical axis deflector 35, for example, an angle of view of 50°, and acquires image data including a measurement range of the surveying instrument 1. The positional relationships between the imaging optical axis 38 and the emission optical axis 26 and between the imaging optical axis 38 and the reference optical axis O are known. The imager 14 can also acquire a dynamic image or continuous images.

An imaging element 39 of the imager 14 is a CCD or CMOS sensor, which is an assembly of pixels, and is configured so that the position of each of the pixels can be identified on the imaging element. For example, each of the pixels has pixel coordinates in a coordinate system having the imaging optical axis 38 as the origin, and the position of the pixel on the imaging element is identified with the pixel coordinates.

The emission direction detector 15 detects a deflection angle and a deflection direction of the distance measuring optical axis 40 deflected by the optical axis deflector 35 and inputs the detection result to the computation controller 19.

The motor driver 16 drives motors (described later) enabling deflection operation of the optical axis deflector 35, on the basis of a control signal from the computation controller 19.

The attitude detector 17 detects inclination of the surveying instrument 1 (the housing 9) with respect to the horizontal plane and inputs a detection signal to the computation controller 19. Note that the posture detecting device disclosed in JP 2016-151423A can be used as the attitude detector 17.

In a case that remote operation is performed with a remote controller (not illustrated), the communicator 18 can exchange data with the remote controller.

The storage 20 stores various pieces of data, such as the image acquired by the imager 14, distance measuring data from the distance measuring computer 13, data of the emission direction and data of the deflection angle acquired by the emission direction detector 15, and data of the inclination detected by the attitude detector 17.

The storage 20 also stores various programs, such as a sequence program for performing measurement, a program for computing the emission direction of the optical axis deflector 35, and a correction program for correcting the distance measuring data on the basis of the inclination detection result from the attitude detector 17.

The computation controller 19 controls operations of the imager 14, the distance meter 30, the optical axis deflector 35, and the like. The computation controller 19 also measures a distance, performs image processing, computes the deflection angle of the emission direction, and corrects a distance measuring result in according with the programs stored in the storage 20.

The imaging controller 21 controls imaging at the imager 14. In a case where the imager 14 acquires the dynamic image or the continuous images, the imaging controller 21 synchronizes the timing of acquiring frame images constituting the dynamic image or the continuous images and the timing of measurement at the surveying instrument 1. The computation controller 19 correlates the image with the distance measuring data.

The display 25 displays the image acquired by the imager 14, a measurement state, the distance measuring data, and the like. Note that the display 25 is a touch panel and also functions as an operating section.

The optical axis deflector 35 will be described.

The optical axis deflector 35 includes a pair of prism deflection plates 36a, 36b and deflection motors 37a, 37b configured to rotate the prism deflection plates 36a, 36b separately.

The prism deflection plates 36a, 36b are parallel with each other. The prism deflection plates 36a, 36b each have an axis center coinciding with the reference optical axis O. The prism deflection plates 36a, 36b rotate about the reference optical axis O.

Each of the prism deflection plates 36a, 36b includes, as an optical deflecting member (described later), a plurality of rod-shaped optical prisms arranged parallel with each other. Each of the optical prisms is an optical glass member having a triangular (wedge-shaped) cross section, and all of the optical prisms have the same refractive properties.

The rotation position of each of the prism deflection plates 36a, 36b and the relative rotation angle between the prism deflection plates 36a, 36b determine the deflection direction and the deflection angle of the distance measuring optical axis 40 passing through the prism deflection plates 36a, 36b. Thus, control of the rotation position of each of the prism deflection plates 36a, 36b allows the distance measuring optical axis 40 to be deflected toward the measurement target object in a freely-selected position, thereby enabling distance measurement and angle measurement of the measurement target object.

Furthermore, in a case where the prism deflection plates 36a, 36b are rotated separately while the distance measuring light 23 is emitted, scanning with the distance measuring light 23 can be performed in a freely-selected pattern. In a case where a distance is measured at each pulse, point group data can be acquired along a scanning path, thereby enabling measurement as a laser scanner.

The optical axis deflector 35 will be described in detail with reference to FIGS. 3 to 6A, 6B, and 6C.

Figure 3:
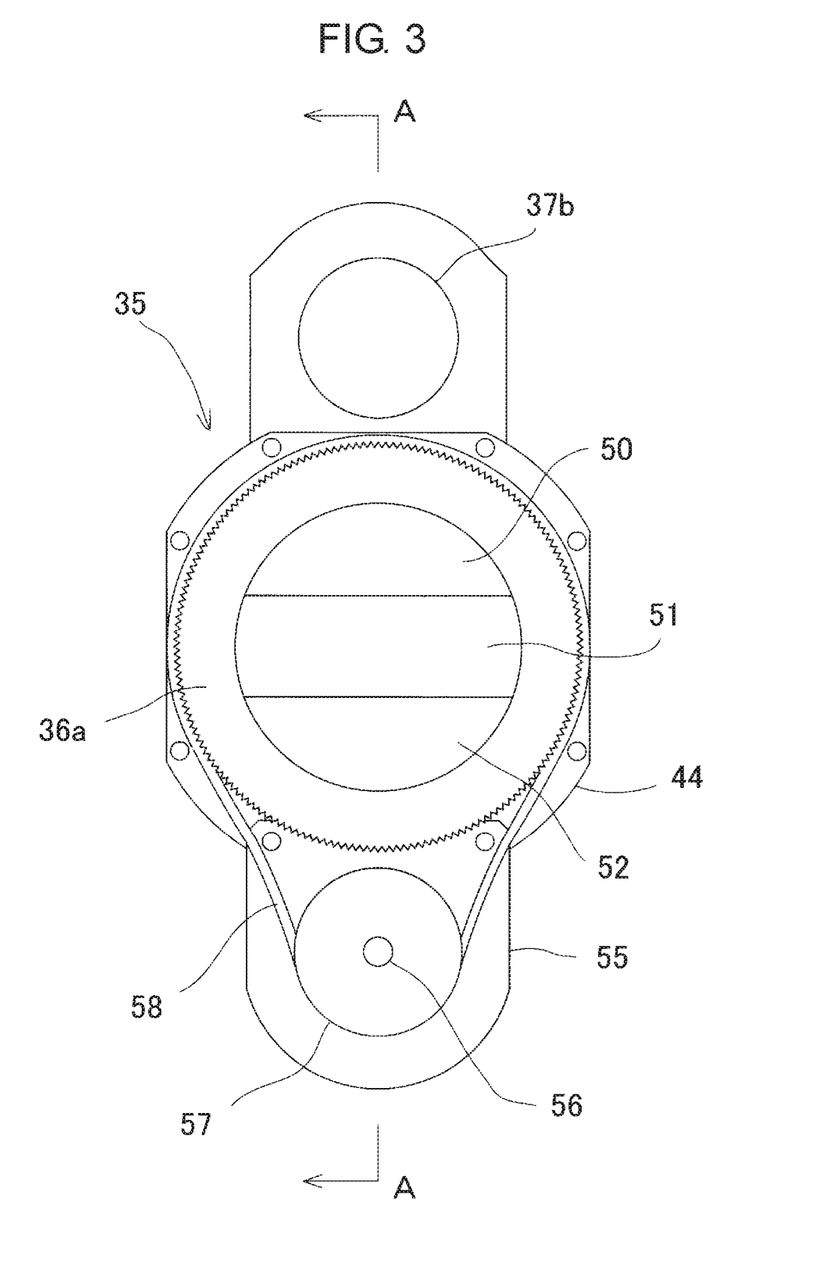
FIG. 3 is a front view of a deflecting device according to an embodiment of the invention.

The prism deflection plates 36a, 36b are disposed on both lateral sides of a ring-shaped holding member 41.

First, the prism deflection plate 36a will be described.

Figure 5:
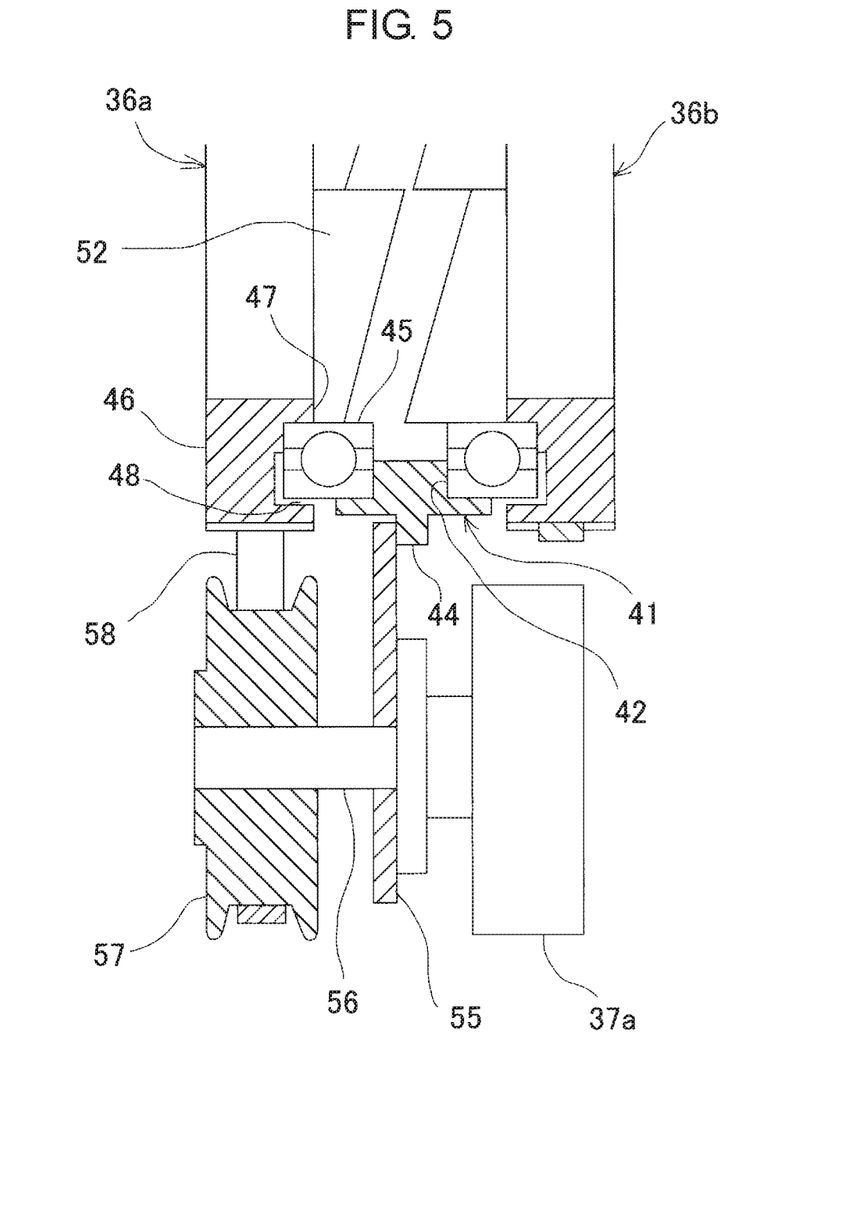
FIG. 5 is an enlarged partial view of a lower portion of FIG. 4.

The holding member 41 includes bearing fitting cavities 42 formed by recessing both sides of the holding member and a bearing receiving protrusion 43 formed at the center of the inner periphery and having a rectangular cross section, thereby serving as outer ring fitting sections. An attachment flange 44 is formed on the outer periphery of the holding member 41.

A bearing 45 is fitted into the bearing fitting cavity 42, and the outer ring of the bearing 45 comes into contact with the bearing receiving protrusion 43. The outer peripheral surface of the outer ring is bonded to the inner peripheral surface of the bearing fitting cavity 42, and a side surface of the outer ring is bonded to a side surface of the bearing receiving protrusion 43. The outer ring of the bearing 45 is thus fixed to the holding member 41.

A ring gear 46 is disposed concentric with the holding member 41 and facing the holding member 41. The ring gear 46 is a timing pulley having an outer peripheral surface engraved with gear teeth. A circular groove concentric with the ring gear 46 is engraved on a side surface (inner side surface) of the ring gear 46 closer to the holding member 41. The inner edge of the circular groove serves as an inner ring fitting section. Furthermore, the inner ring fitting section serves as a shaft 47 fitted with the inner ring of the bearing 45. A gap 48 is formed on the periphery of the outer ring of the bearing 45. The ring gear 46 thus does not come into contact with the outer ring of the bearing 45.

The shaft 47 is bonded to the inner ring of the bearing 45. The inner ring and the ring gear 46 are thus fixed to each other and rotate together.

The circular groove engraved on the ring gear 46 allows the inner edge of the ring gear 46 to protrude in a ring shape. In addition, the inner edge serving as the shaft 47 allows the ring gear 46 to be supported by the bearing 45 rotatably without forming a shaft on the ring gear 46 additionally, that is, without increasing the shaft length (thickness) of the ring gear 46. Furthermore, the bearing 45 is partially stored in the circular groove, so that the shaft length (thickness) of the prism deflection plate 36a can be significantly short.

An optical deflecting member is disposed inside the inner ring of the bearing 45. The optical deflecting member is constituted by a plurality of optical prisms 50, 51, 52. The number is an odd number (three in the drawings). Each of the optical prisms 50, 51, 52 is a rod-shaped optical member extending perpendicular to the paper, and the three optical prisms 50, 51, 52 are arranged parallel with each other. The optical prisms 50, 51, 52 are typically made from optical glass.

The outer shape of the optical prisms 50, 51, 52 as a whole is a circle fitted into the inner ring of the bearing 45. Each of the optical prisms 50, 51, 52 is bonded to one or both of an end surface of the shaft 47 and the inner ring of the bearing 45. The optical prisms 50, 51, 52 are thus integrated with the ring gear 46.

The optical prisms 50, 51, 52 are directly fitted into the inner ring of the bearing 45, so that the thickness of the optical prisms 50, 51, 52 partially overlaps with the thickness of the bearing 45. Thus, the shaft length of the prism deflection plate 36a including the optical prisms 50, 51, 52 can be significantly short.

The number and size of the optical prisms 50, 51, 52 are not particularly limited to a specific number and size. However, the width (the height in FIG. 6A) of the central optical prism 51, through which the axis center of the prism deflection plate 36a, that is, the reference optical axis O passes, is preferably greater than the diameter of a pencil of the distance measuring light 23 to prevent the pencil of the distance measuring light 23 from splitting.

The inner diameter of the ring gear 46 is determined such that a sufficient amount of the reflected distance measuring light 24 is acquired.

In the above description, the optical prisms are made from optical glass. However, only the central portion where the distance measuring light 23 passes through may be made from optical glass, and the other portion where the reflected distance measuring light 24 is incident may be constituted by a Fresnel lens made from synthetic resin.

A motor substrate 55 is fastened to a side surface of the attachment flange 44 closer to the prism deflection plate 36a (the left side surface in the drawings), and the deflection motor 37a is attached to the motor substrate 55.

A driving timing pulley 57 is fastened to an output shaft 56 of the deflection motor 37a. A timing belt 58 is wound around the driving timing pulley 57 and the ring gear 46. The driving timing pulley 57 has a smaller diameter than that of the ring gear 46.

The attachment flange 44 is fixed to a structural member supporting the optical axis deflector 35. For example, the attachment flange 44 is fixed to the housing 9. Thus, the holding member 41 is supported by the structural member, and the prism deflection plates 36a, 36b are rotatably supported by the holding member 41 with the bearings 45, 45 there between.

When the deflection motor 37a is driven, the driving timing pulley 57 rotates through the output shaft 56, and the rotation of the driving timing pulley 57 is transmitted to the ring gear 46. Furthermore, since the driving timing pulley 57 has a smaller diameter than that of the ring gear 46, the rotation is decelerated when transmitted.

The prism deflection plate 36b has a configuration symmetrical to that of the prism deflection plate 36a; thus, descriptions thereof will be omitted. Furthermore, the deflection motors 37a, 37b and the driving timing pulleys 57 are positioned at an angle of 180° to the axis of the optical axis deflector in FIGS. 3 and 4, but are only required to be in such positions as not to interfere with other members and may be positioned at an angle of 90° or 60°.

As described above, the prism deflection plate 36a is rotatably supported by the attachment flange 44, and similarly, the prism deflection plate 36b is rotatably supported by the attachment flange 44. This configuration allows the prism deflection plates 36a, 36b to rotate freely without mutual interference.

Motors that can control a rotation angle are used as the deflection motors 37a, 37b. For example, pulse motors are used that control a drive pulse number to control rotation and detect a rotation angle with a pulse number. Alternatively, encoders may be attached to the deflection motors 37a, 37b, and a rotation angle, a rotation speed, and the like may be controlled on the basis of detection signals from the encoders.

Separate control of the deflection motors 37a, 37b enables the prism deflection plates 36a, 36b to be rotated separately in freely-selected directions at freely-selected rotation speeds and the distance measuring optical axis 40 to be deflected in a freely-selected direction at a freely-selected speed.

Transmission of rotation with the timing belt 58 results in less backlash than the case in which gears mesh directly with each other, and rotation is decelerated when transmitted from the driving timing pulley 57 to the ring gear 46. Thus, the resolution and rotation accuracy of rotary drive of the deflection motor 37a can be enhanced.

In a case where the maximum deflection angle of the optical axis deflector 35 is determined to be ±10°, 180° rotation of one prism deflection plate 36a provides a maximum deflection angle of 20°. Thus, a rotation error of the prism deflection plate 36a is ⅕ in terms of an error in the deflection angle. Accordingly, the deflection angle is controlled with high accuracy.

The timing pulley and the timing belt are used as a drive transmitting member for rotating the ring gear 46. However, instead of the timing pulley and the timing belt, a pinion gear being the drive transmitting member may be meshed with the ring gear 46, and the ring gear 46 may be rotated directly with the pinion gear through gear connection. This case also reduces effect of an error, such as backlash, and thus yields high deflection angle accuracy.

The action of the optical axis deflector 35 will be described.

The computation controller 19 can control various types of deflecting action of the optical axis deflector 35 through control of the rotation directions and rotation speeds of the deflection motors 37a, 37b and the rotation ratio between the deflection motors 37a, 37b, normal and reverse rotation of the deflection motors 37a, 37b, and the like.

The emission direction detector 15 detects the rotation angles of the deflection motors 37a, 37b by counting drive pulses input to the deflection motors 37a, 37b. Alternatively, the emission direction detector 15 detects the rotation angles of the deflection motors 37a, 37b on the basis of signals from the encoders. The emission direction detector 15 also computes the rotation positions of the prism deflection plates 36a, 36b on the basis of the rotation angles of the deflection motors 37a, 37b. In addition, the emission direction detector 15 computes the deflection angle and emission direction of the distance measuring light by pulsed light on the basis of the refractive index of the optical prisms 50, 51, 52 and the rotation positions of the prism deflection plates 36a, 36b. The computation result is correlated with a distance measuring result and input to the computation controller 19.

The horizontal angle and vertical angle at the measurement point are computed from the deflection angle and emission direction of the distance measuring light 23, and the horizontal angle and vertical angle are correlated with the distance measuring data for the measurement point, thereby acquiring three-dimensional data of the measurement target object.

While the prism deflection plates 36a, 36b are continuously rotated, for example, at various rotation speeds or in the normal and reverse directions, by controlling drive of the deflection motors 37a, 37b, the distance measuring light 23 is emitted. In this way, scanning with the distance measuring light 23 can be performed in various scanning modes.

The deflecting action and scanning action of the optical axis deflector 35 will be described with reference to FIGS. 6A, 6B, and 6C.

Figure 6A:
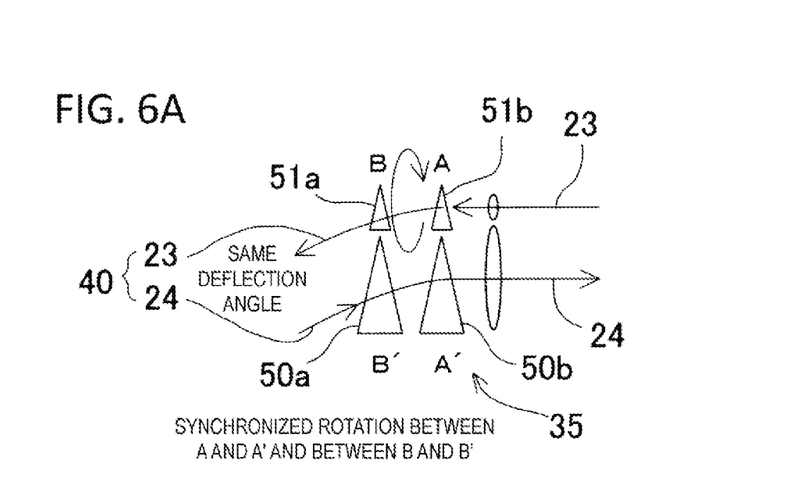
FIGS. 6A to 6C are explanatory diagrams of action of the deflecting device of the embodiment.
Figure 6B:
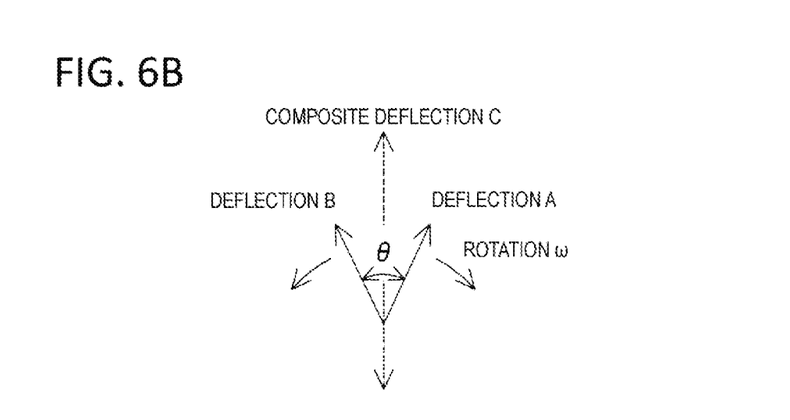
Figure 6C:
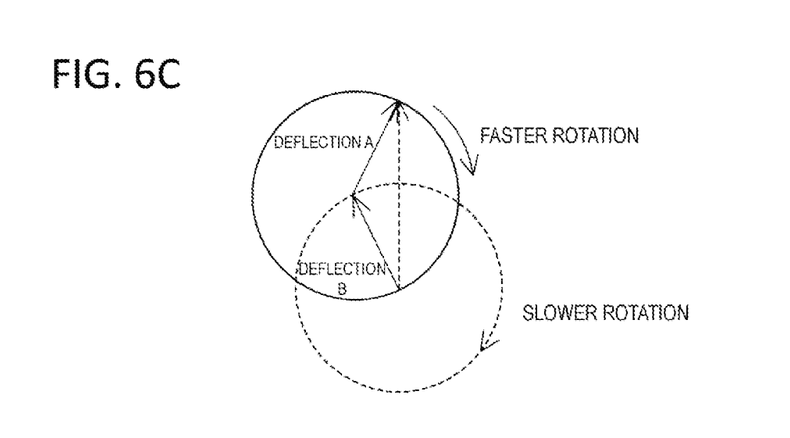

Note that in FIGS. 6A, 6B, and 6C, the optical prisms of the prism deflection plate 36a are designated by 50a and 51a, and the optical prisms of the prism deflection plate 36b are designated by 50b and 51b.

In FIG. 6A, to simplify the description, the optical prisms 50, 52 and the optical prism 51 of the prism deflection plates 36a, 36b are separated from each other. FIG. 6A illustrates the state in which the optical prisms 50a, 51a of the prism deflection plates 36a and the optical prisms 50b, 51b of the prism deflection plate 36b are positioned in the same direction. In this state, the maximum deflection angle (for example, ±20°) is acquired. The minimum deflection angle is acquired in the state in which either one of the prism deflection plates 36a, 36b rotates 180°. In this state, optical action of the optical prisms 50a, 51a of the prism deflection plates 36a and optical action of the optical prisms 50b, 51b of the prism deflection plate 36b are offset, resulting in a deflection angle of 0°. Thus, the optical axis (the distance measuring optical axis 40) of a pulse laser beam emitted or received through the prism deflection plates 36a, 36b coincides with the reference optical axis O.

The distance measuring light 23 is emitted from the light emitting element 27, is made to be a parallel pencil by the projection lens 28, passes through the optical prisms 51a, 51b, and is emitted toward the prism 7. The distance measuring light 23 is deflected in a specific direction by the optical prisms 51a, 51b and then emitted (FIG. 6A).

The reflected distance measuring light 24 reflected off the prism 7 is incident on the imaging lens 34 through the optical prisms 50a, 50b, 52a, 52b and is concentrated at the light receiving element 33 by the imaging lens 34.

When the reflected distance measuring light 24 passes through the optical prisms 50a, 50b, 52a, 52b, the optical axis of the reflected distance measuring light 24 is deflected so as to coincide with the reception light optical axis 31 (FIG. 6A).

A combination of the rotation positions of the prism deflection plate 36a and the prism deflection plate 36b can freely vary the deflection direction and deflection angle of the emitted distance measuring light.

In a case where the deflection motors 37a, 37b rotate the prism deflection plate 36a and the prism deflection plate 36b together as one while the positional relationship between the prism deflection plate 36a and the prism deflection plate 36b is fixed, the distance measuring light passing through the optical prisms 51a, 51b draws a path shaped into a circle centered on the distance measuring optical axis 40.

Thus, in a case where the optical axis deflector 35 is rotated while the light emitting element 27 emits a laser beam, scanning with the distance measuring light 23 can be performed along a circular path. It should be understood that the prism deflection plates 36a, 36b are rotated together as one.

Next, FIG. 6B illustrates the case in which the prism deflection plate 36a and the prism deflection plate 36b are rotated relatively. When the deflection direction of the optical axis deflected by the prism deflection plate 36a is represented by deflection A and the deflection direction of the optical axis deflected by the prism deflection plate 36b is represented by deflection B, the deflection of the optical axis deflected by the prism deflection plates 36a, 36b is composite deflection C with an angular difference θ between the prism deflection plates 36a, 36b.

Thus, in a case where the prism deflection plate 36a and the prism deflection plate 36b perform to-and-fro rotational oscillation at a uniform speed while being synchronized with each other in mutually different directions, the distance measuring light passing through the prism deflection plates 36a, 36b enables linear scanning. In this way, to-and-fro rotational oscillation of the prism deflection plate 36a and the prism deflection plate 36b in mutually different directions at a uniform speed enables to-and-fro scanning with the distance measuring light along a linear path in the direction of the composite deflection C, as described in FIG. 6B.

Furthermore, as described in FIG. 6C, in a case where the prism deflection plate 36b is rotated at a slower rotation speed than the rotation speed of the prism deflection plate 36a, the distance measuring light is rotated while the angular difference θ increases gradually, resulting in a spiral scanning path of the distance measuring light.

In a case where the rotation directions and rotation speeds of the prism deflection plate 36a and the prism deflection plate 36b are controlled separately, various scanning patterns are acquired. For example, a direction of the scanning path of the distance measuring light is in an illumination direction with the reference optical axis O being the center (scanning in a radial direction), or in a horizontal or vertical direction.

In a case where distance measuring data and angle measurement data are acquired at each pulse during scanning with the distance measuring light 23, point group data can be acquired. This indicates that the surveying instrument 1 of the present embodiment can be used as a laser scanner.

Figure 1:
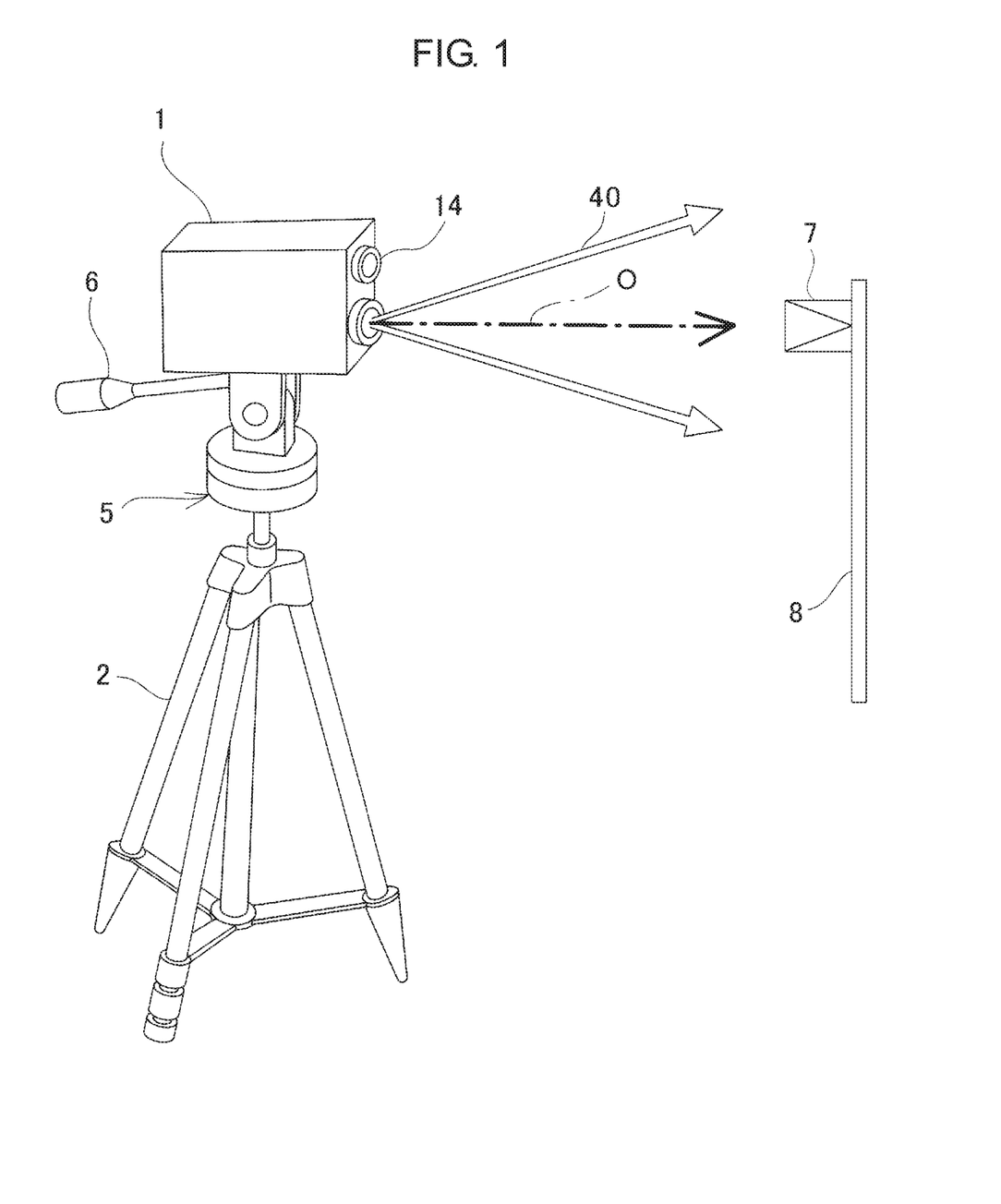
FIG. 1 is an external schematic view of a surveying instrument embodying the invention.

As described in FIG. 1, the optical axis deflector 35 deflects the optical axis to collimate the distance measuring optical axis 40 toward the prism 7, a distance is measured at the time of the collimation, and the emission direction detector 15 measures the collimation direction. At this time, the surveying instrument 1 functions as a total station.

In the present embodiment, in a case where the pole 8 is moved and installed at another measurement point, collimation toward the prism 7 can be performed only by rotating the prism deflection plates 36a, 36b without requiring rotation of the surveying instrument 1. Thus, collimation toward the other measurement point can be performed promptly.

In the present embodiment, the distance measuring optical axis can be deflected at high speed in two directions, horizontally and vertically, continuous scanning can be performed at high speed in a freely-selected pattern, and change of a scanning pattern enables various types of measurement, for example, scanning in different densities and scanning with the optical axis fixed to a specific measurement point.

The optical axis deflector 35 can be modified in various ways.

FIG. 7 illustrates another embodiment of the optical axis deflector 35.

This embodiment has a structure in which the prism deflection plate 36a and the prism deflection plate 36b are provided interposing the holding member 41 there between in the same manner as the structure of the above-described embodiment. However, in this embodiment, the inner rings of the bearings 45 are fixed to the holding member 41, and the outer rings of the bearings 45 are fixed to the ring gear 46.

The holding member 41 is shaped into a ring. The inner edge of the hole protrudes toward the prism deflection plates 36a, 36b, forming a shaft 61. The shaft 61 serves as an inner ring fitting section fitted with the inner rings of the bearings 45. The inner ring fitting section is bonded to the inner rings and thus fixed to the inner rings.

The inner side surfaces of the ring gears 46 are engraved with circular grooves 62. The outer edges of the circular grooves 62 are formed into ring-shaped ridges 63. The ridges 63 serve as outer ring fitting sections fitted with the outer rings of the bearings 45. The outer ring fitting sections and the outer rings of the bearings 45 are fixed to each other by adhesion. Note that the circular grooves 62 are deeper on the inner sides so as not to come into contact with the inner rings of the bearings 45.

The circular grooves 62 have inner edges 64 further protruding inward. The optical prisms 50, 51, 52 are fixed to the inner edges 64 by adhesion or the like.

This configuration allows the ring gears 46 to rotate freely with respect to the holding member 41, the ring gears 46 to be rotated by the deflection motor 37a through the driving timing pulley 57 and the timing belt 58, and the optical prisms 50, 51, 52 to rotate together with the ring gears 46.

Thus, the prism deflection plate 36a is rotated by the deflection motor 37a independently, and the prism deflection plate 36b is rotated by the deflection motor 37b independently.

Also in the other embodiment, separate rotation control of the prism deflection plates 36a, 36b enables continuous scanning at high speed in a freely-selected pattern, and change of a scanning pattern enables various types of measurement, for example, scanning in different densities and scanning with the optical axis fixed to a specific measurement point.

As described above, the optical axis deflector 35 of the present embodiment can reduce the number of components and can be manufactured inexpensively. Furthermore, since the optical axis deflector is small and thin, the optical axis deflector can be applied to a hand-held measuring instrument.

What is claimed is:

1. A deflecting device comprising:
a holding member having a ring shape;
ring gears disposed on both sides of the holding member with the holding member interposed between the ring gears, the ring gears being concentric with the holding member;
bearings disposed between the holding member and the ring gears on both sides of the holding member, the bearings being concentric with the holding member;
optical deflecting members disposed at central portions of the ring gears and integrated with the ring gears;
deflection motors corresponding to the respective ring gears; and
a drive transmitting member configured to transmit rotary force of the deflection motors to the ring gears;
wherein each of the bearings includes an outer ring fitted into and fixed to an outer ring fitting section on either one of the holding member and the corresponding ring gear,
each of the bearings includes an inner ring fitted into and fixed to an inner ring fitting section on the other of the holding member and the corresponding ring gear,
the ring gears on both sides of the holding member are supported by the holding member, the ring gears being configured to rotate independently of each other, and
the deflection motors are configured to independently rotate the respective optical deflecting members together with the ring gears.

2. The deflecting device according to claim 1,
wherein each of the ring gears includes a groove having a ring shape in a surface of each of the ring gears, the surface facing the holding member,
the groove includes an inner edge portion protruding toward the holding member and serving as the inner ring fitting section, and
the holding member includes outer edges protruding toward the ring gears and serving as the outer ring fitting sections.

3. The deflecting device according to claim 2,
wherein the outer ring fitting sections and the outer rings of the bearings are bonded to each other, and
the inner ring fitting sections and the inner rings of the bearings are bonded to each other.

4. The deflecting device according to claim 1,
wherein each of the ring gears includes a groove having a ring shape in a surface of each of the ring gears, the surface facing the holding member, the groove includes an outer edge portion protruding toward the holding member and serving as the outer ring fitting section, and the holding member includes inner edges protruding toward the ring gears and serving as the inner ring fitting sections.

5. The deflecting device according to claim 4, wherein the outer ring fitting sections and the outer rings of the bearings are bonded to each other, and the inner ring fitting sections and the inner rings of the bearings are bonded to each other.

6. The deflecting device according claim 1, wherein each of the optical deflecting members includes a plurality of prisms arranged parallel with each other.

7. The deflecting device according to claim 1, wherein the ring gears are driving timing pulleys, the driving timing pulleys are disposed on output shafts of the deflection motors, timing belts are disposed between the ring gears and the driving timing pulleys, and the ring gears are configured to be rotated by the deflection motors through the timing belts.

8. A surveying instrument comprising:
a distance meter including:
  a light emitting element configured to send out distance measuring light;
  a distance measuring light emitter configured to emit the distance measuring light;
  a receiver configured to receive reflected distance measuring light; and
  a light receiving element configured to receive the reflected distance measuring light and to generate a light reception signal, the distance meter being configured to measure a distance to a measurement target object on a basis of the light reception signal from the light receiving element;
an optical axis deflector disposed on a distance measuring optical axis and configured to deflect the distance measuring optical axis;
an emission direction detector configured to detect a deflection angle of the distance measuring optical axis; and
a computation controller configured to control deflecting action of the optical axis deflector and distance measuring action of the distance meter, to measure a horizontal angle and a vertical angle of the measurement target object on a basis of the deflection angle detected by the emission direction detector, and to acquire three-dimensional coordinates of the measurement target object on a basis of a distance value from the distance meter and the horizontal angle and vertical angle.

9. The surveying instrument of claim 8 wherein the optical axis deflector further comprises:
a holding member having a ring shape;
ring gears disposed on both sides of the holding member with the holding member interposed between the ring gears, the ring gears being concentric with the holding member;
bearings disposed between the holding member and the ring gears on both sides of the holding member, the bearings being concentric with the holding member;
optical deflecting members disposed at central portions of the ring gears and integrated with the ring gears;
deflection motors corresponding to the respective ring gears; and
a drive transmitting member configured to transmit rotary force of the deflection motors to the ring gears;
wherein each of the bearings includes an outer ring fitted into and fixed to an outer ring fitting section on either one of the holding member and the corresponding ring gear,
each of the bearings includes an inner ring fitted into and fixed to an inner ring fitting section on the other of the holding member and the corresponding ring gear,
the ring gears on both sides of the holding member are supported by the holding member, the ring gears being configured to rotate independently of each other, and
the deflection motors are configured to independently rotate the respective optical deflecting members together with the ring gears.

10. The surveying instrument of claim 9 wherein each of the ring gears includes a groove having a ring shape in a surface of each of the ring gears, the surface facing the holding member, and the groove includes an inner edge portion protruding toward the holding member and serving as the inner ring fitting section, and the holding member includes outer edges protruding toward the ring gears and serving as the outer ring fitting sections.

11. The surveying instrument of claim 10 wherein the outer ring fitting sections and the outer rings of the bearings are bonded to each other, and the inner ring fitting sections and the inner rings of the bearings are bonded to each other.

12. The surveying instrument of claim 9 wherein each of the ring gears includes a groove having a ring shape in a surface of each of the ring gears, the surface facing the holding member, and the groove includes an outer edge portion protruding toward the holding member and serving as the outer ring fitting section, and the holding member includes inner edges protruding toward the ring gears and serving as the inner ring fitting sections.

13. The surveying instrument of claim 12 wherein the outer ring fitting sections and the outer rings of the bearings are bonded to each other, and the inner ring fitting sections and the inner rings of the bearings are bonded to each other.

14. The surveying instrument of claim 9 wherein each of the optical deflecting members includes a plurality of prisms arranged parallel with each other.

15. The surveying instrument of claim 9,
wherein the ring gears are driving timing pulleys,
the driving timing pulleys are disposed on output shafts of the deflection motors,
timing belts are disposed between the ring gears and the driving timing pulleys, and
the ring gears are configured to be rotated by the deflection motors through the timing belts.

* * * * *